Oct. 15, 1968    R. T. PEACOCK    3,405,450
PLUMB BOB
Filed July 18, 1966

INVENTOR.
REGINALD T. PEACOCK

BY *Kimmel, Crowell & Weaver*
ATTORNEYS.

United States Patent Office 3,405,450
Patented Oct. 15, 1968

3,405,450
PLUMB BOB
Reginald T. Peacock, 5561 Lower Wyandotte Road,
Oroville, Calif. 95965
Filed July 18, 1966, Ser. No. 565,949
3 Claims. (Cl. 33—217)

ABSTRACT OF THE DISCLOSURE

A plumb bob comprising a spool within a cap for winding the plumb line thereon. The plumb body is secured to the cap by a ring positioned under the spool. Bias means are provided between the upper surface of the spool and the cap to maintain a desired resistance to unwinding of the spool.

---

This invention relates to a plumb bob and in particular, to a plumb bob having means for winding and unwinding the plumb line included therein and allowing for fractional adjustment of the height at the plumb bob.

It is known in the prior art to provide means in plumb bobs for winding the plumb line. However, the devices of the prior art suffer from several disadvantages related to their complexity of manufacture and use and their lack of dependability in use. It is an object of this invention to provide a plum bob having integral therewith means for winding the plumb line and fractional adjustment of height at said plumb bob which is easily manufactured.

It is a further object of this invention to provide a plumb bob having windup means for the plumb line which has a minimum of moving parts and is therefore more dependable than the plumb bobs of the prior art.

An additional object of this invention is to provide a novel plumb bob including novel and simplified means for attaching a cap thereto for winding and unwinding the plumb line.

It is a further object of this invention to provide a plumb bob having novel frictionally limited rotational motion of a cap about a spool on which the plumb line is wound and mechanism for providing said motion.

It is a further object of this invention to provide an easily adjusted plumb bob height at point of tack for more accurate measurements.

It is a further object of this invention to provide for a quick method of unwinding said plumb line but still allow the bob to stop and remain stationary at any given height.

It is a further object of this invention to provide an enclosed storage space for said plumb line to avoid injuring or entangling of said plumb line when the plumb bob is not in use.

It is a further object of this invention to provide a superior type of plumb bob that will materially reduce the time necessary to set up and take measurements with said plumb bob.

It is a further object of this invention to provide an improved plumb bob cap and spool that will adapt to any standard plumb bob.

Other objects and advantages of this invention will become apparent from the specification which follows and from the drawing to which reference is made.

Figure 1:
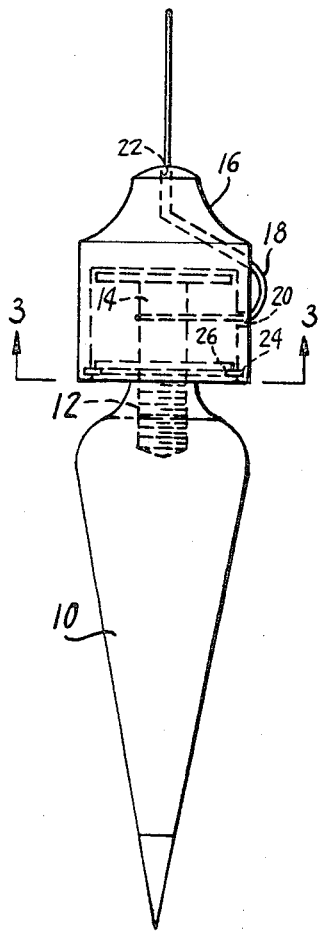
FIGURE 1 is a side view of the plumb bob of this invention.
Figure 2:
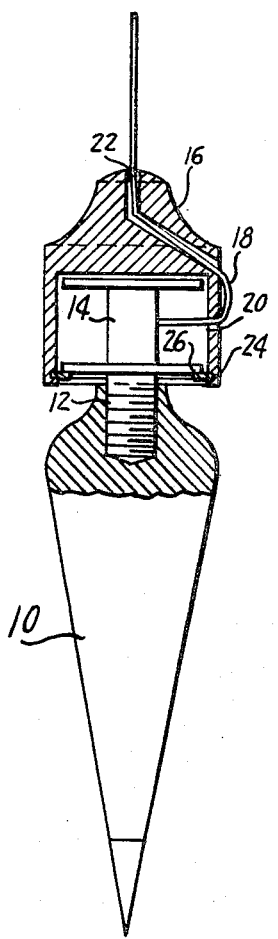
FIGURE 2 is the plumb bob of this invention shown in partial cross-section.

With reference now to the drawing, the plumb bob comprises a body 10 which may be of any conventional shape. As indicated in the drawings such plumb bobs are normally made in a generally conical configuration. The body includes, in a preferred embodiment, a threaded securing means 12 in the top thereof which may be a female threaded aperture in the body as shown in FIGURES 1 and 2 or male as shown at 13 in FIGURE 4. The threaded securing means fixedly secures a spool 14 to the top of the plumb bob body. A cap 16 is received over and around the spool 14 for retaining a plumb line 18 which is wound on spool 14.

Figure 4:
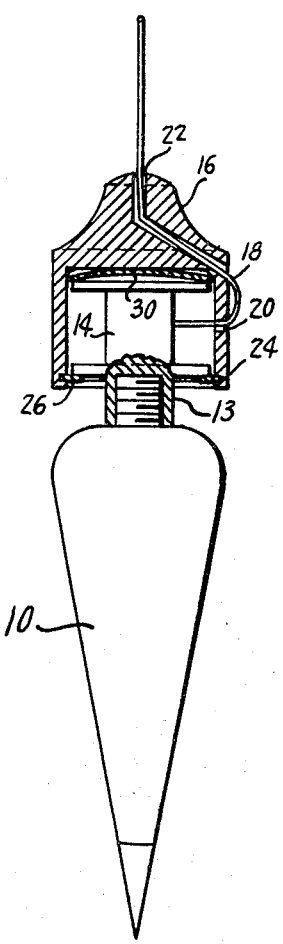
FIGURE 4 is an additional modification of this invention showing a means for increasing and controlling the frictional movement controlling features of this invention.
Figure 3:
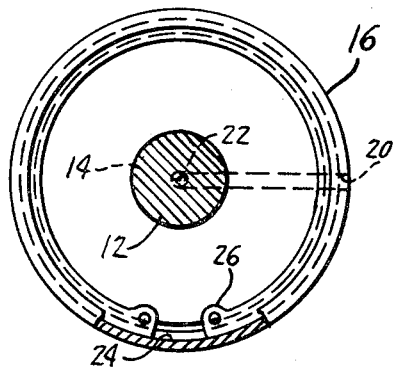
FIGURE 3 is a view of the novel retaining and frictional motion limiting means of this invention taken along line 3—3 in the direction of the arrows as shown in FIGURE 1.

The cap 16 includes in the bottom thereof a cylindrical chamber having a top surface and side walls and having integrally formed therein an aperture 20 extending through the side wall of the chamber communicating with the exterior surface of the cap. The cap also includes a closed conduit 22 extending from the exterior side of the cap adjacent the aperture through the cap to the center of the top of the cap as shown in FIGURES 1, 2 and 4. Conduit 22 and aperture 20 form a passageway for plumb line 18 from the top of the cap to the spool.

An important feature of this invention comprises the retaining means for engaging the spool and supporting the body of the plumb bob. In a preferred embodiment, the retaining means includes a ring groove 24 integrally formed in the lower side wall of the cylindrical chamber near the bottom thereof in which a retaining ring 26 is received. The retaining ring 26 frictionally engages the bottom of the spool 14 to permit frictionally limited rotary motion of the spool 14 with respect to the cap and to support the body 10 of the plumb bob.

Figure 5:
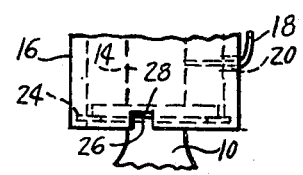
FIGURE 5 is a partial view of the cap and top of the plumb bob of this invention showing mean for easily removing the retaining mean of this invention.

An additional important feature of this invention is the provision of a notch 28 in the lower edge of the cap 16, as shown in FIGURE 5, to permit easy removal of the retaining ring without the need of special tools.

It will be recognized by those skilled in the art that the plumb line may be wound out to extend the plumb bob by turning the body with respect to the cap, the spool being fixedly secured to the body. The rotary motion is limited by the friction between the bottom of the spool 14 and retaining ring 26 to prevent undesirable feeding out of the plumb line. Similarly, the plumb line may be wound in merely by turning the body with respect to the cap in the opposite direction.

For quick unwinding of line from spool, the line may be secured to fixed point and pressure exerted downward on the exterior of cap 16 will cause line to be rapidly unwound. The plumb bob will remain stationary on release of downward pressure on cap 16.

In addition, fractional height adjustments may be made by rotating cap 16 and holding bob 10 and on release bob 10 will maintain desired height.

An additional, and important, feature of this invention is the provision of bias means between the upper surface of the spool 14 and the upper surface of the cylindrical chamber and the cap to provide additional friction between the retaining ring 26 and the bottom of the spool 14 and to provide a more uniform frictional engagement therebetween. It will be understood, of course, that depending upon the force exerted by the bias means the natural gravitational friction may become negligible. Such a bias means is shown in FIGURE 4 and comprises a disk spring 30. Such a disk spring is formed by extending the center of a disk of spring metal to provide compression when the retaining ring 26 is placed in groove 24.

It will be understood that other bias means, for example different types of springs, may be used without departing from the spirit of the invention. In addition, while the groove and retaining ring is a highly desirable and important feature of this invention, equivalent retaining means which provide the necessary frictional engagement with the bottom of spool 14 may be provided.

It will also be understood that the invention has been described with regard to the specific examples shown in the figures; however, the details and dimensions of construction may be varied and adjusted.

I claim:
1. A plumb bob comprising,
   a body,
   a spool fixedly secured to the body for holding wound plumb line thereon,
   a cap rotatably received over and around the spool to retain the plumb line; said cap including integrally formed therein
      a cylindrical chamber in the bottom of the cap for receiving the spool, said chamber having a top surface and a circumferential side wall and being open at its bottom
      an aperture through the side of the chamber communicating with the exterior side surface of the cap,
      a conduit from a point on the side surface of the cap adjacent the aperture through the cap to the center of the cap top, said aperture and conduit forming a passageway from the spool to the top center of the cap for the plumb line, and
      a ring groove in the side wall adjacent the bottom of the cylindrical chamber,
   retaining means engaging the bottom edge of the cylinder in the cap and slidably engaging the bottom of the spool to retain the cap over the spool and to permit frictionally limited rotational motion of the cap about the spool, said retaining means comprising
      a ring received in the ring groove and extending under the edge of the bottom of the spool for frictionally engaging the spool and supporting the body from the cap, and
   bias means between the top surface of the spool and the top surface of the cylindrical chamber for biasing the bottom surface of the spool into engagement with the retaining ring and thereby increasing and providing a uniform sliding friction between the spool and the retaining means.

2. The invention of claim 1 wherein the bias means is a solid disk spring.

3. The invention of claim 1 wherein the cap further includes an integrally formed notch in the bottom edge thereof to permit easy removal of the retaining ring without special tools.

References Cited

UNITED STATES PATENTS

| | | | |
|---|---|---|---|
| 1,026,669 | 5/1921 | Garner | 33—217 |
| 1,816,786 | 7/1931 | Morris | 33—217 |
| 2,618,863 | 11/1952 | Johnson | 33—217 |
| 2,621,421 | 12/1952 | Owens | 33—217 |

LEONARD FORMAN, *Primary Examiner.*

L. ANDERSON, *Assistant Examiner.*